United States Patent [19]
Komlosi et al.

[11] Patent Number: 5,873,863
[45] Date of Patent: *Feb. 23, 1999

[54] VASCULAR SURGERY DEMONSTRATION/ TRAINING KIT

[75] Inventors: Andrew Komlosi, Fairfield; Christopher Della Vecchia, Shelton, both of Conn.

[73] Assignee: United States Surgical Corporation, Norwalk, Conn.

[*] Notice: This patent issued on a continued prosecution application filed under 37 CFR 1.53(d), and is subject to the twenty year patent term provisions of 35 U.S.C. 154(a)(2).

[21] Appl. No.: 924,715

[22] Filed: Aug. 29, 1997

[51] Int. Cl.⁶ .................................................. A61M 5/00
[52] U.S. Cl. ............................ 604/259; 606/148; 623/1; 434/272
[58] Field of Search .................................. 604/240, 259, 604/403; 128/912, DIG. 24; 600/485; 312/204, 209; 623/1; 606/149, 150, 151, 139, 140; 434/272, 268, 262

[56] References Cited

U.S. PATENT DOCUMENTS

| | | |
|---|---|---|
| 3,430,360 | 3/1969 | Clark et al. . |
| 4,312,345 | 1/1982 | Colvin ................................. 604/259 |
| 4,789,340 | 12/1988 | Zikria . |
| 5,112,228 | 5/1992 | Zouras . |
| 5,215,469 | 6/1993 | Kohnke et al. . |
| 5,310,348 | 5/1994 | Miller . |
| 5,320,537 | 6/1994 | Watson . |
| 5,396,895 | 3/1995 | Takashima et al. . |
| 5,411,437 | 5/1995 | Weber et al. . |
| 5,484,095 | 1/1996 | Green et al. . |
| 5,571,090 | 11/1996 | Sherts . |
| 5,591,178 | 1/1997 | Green et al. . |

*Primary Examiner*—Michael Powell Buiz
*Assistant Examiner*—Julian W. Woo

[57] ABSTRACT

A surgery demonstration kit for comparing different surgical fastening tools and techniques includes a tube for simulating a vascular segment or other such body tissue, the vascular simulation tube being mounted to supports on a frame. The tube is cut to form at least one, and preferably two, side by side slits which are then repaired with the alternative tissue fastening instruments and techniques to be compared. A fluid conduit conducts fluid to the vascular simulation tube and the fluid is pressurized until one or both of the repaired slits begins to leak fluid. The kit is portable and the frame folds into a convenient carrying container.

21 Claims, 7 Drawing Sheets

FIG_1

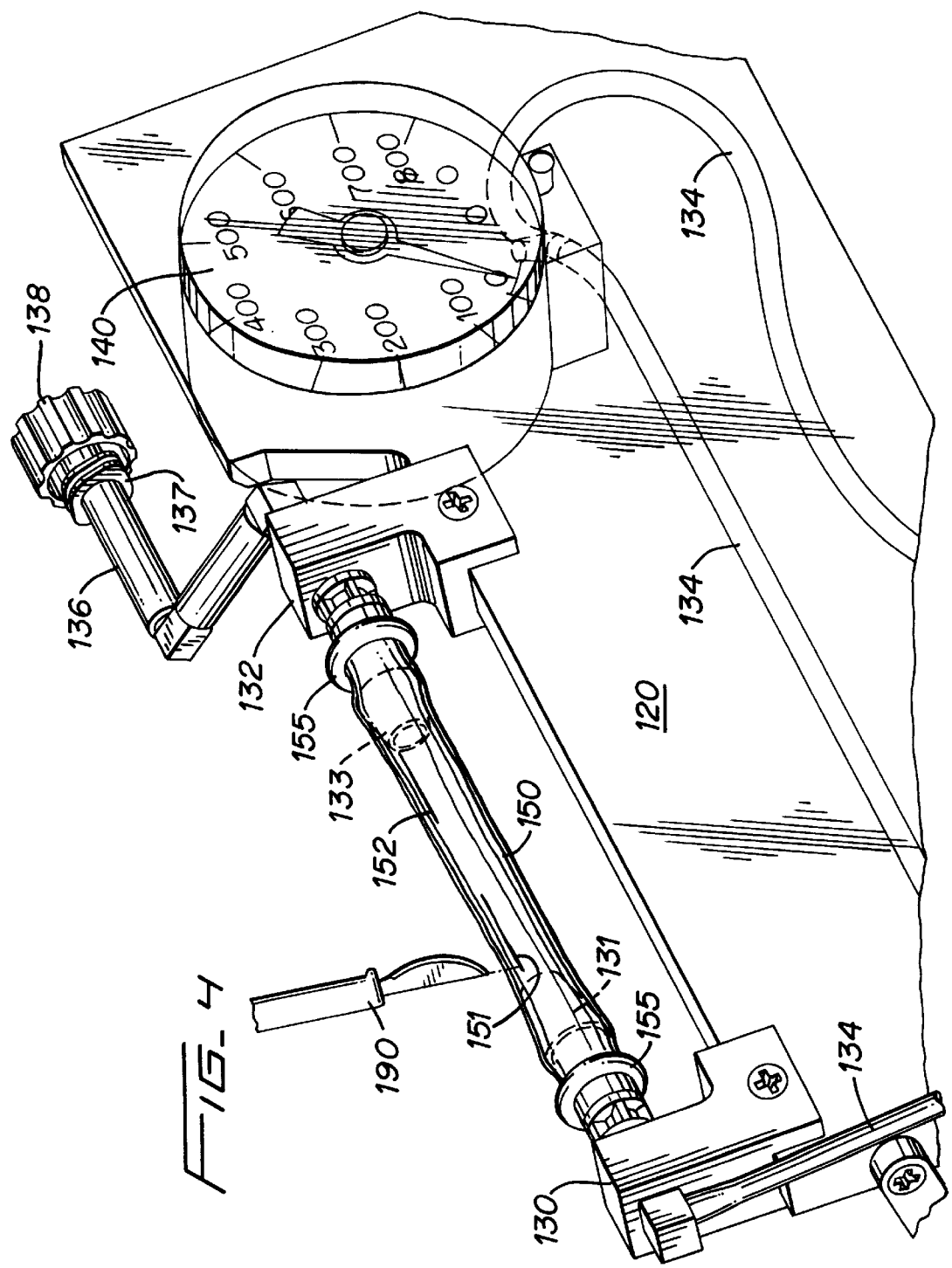

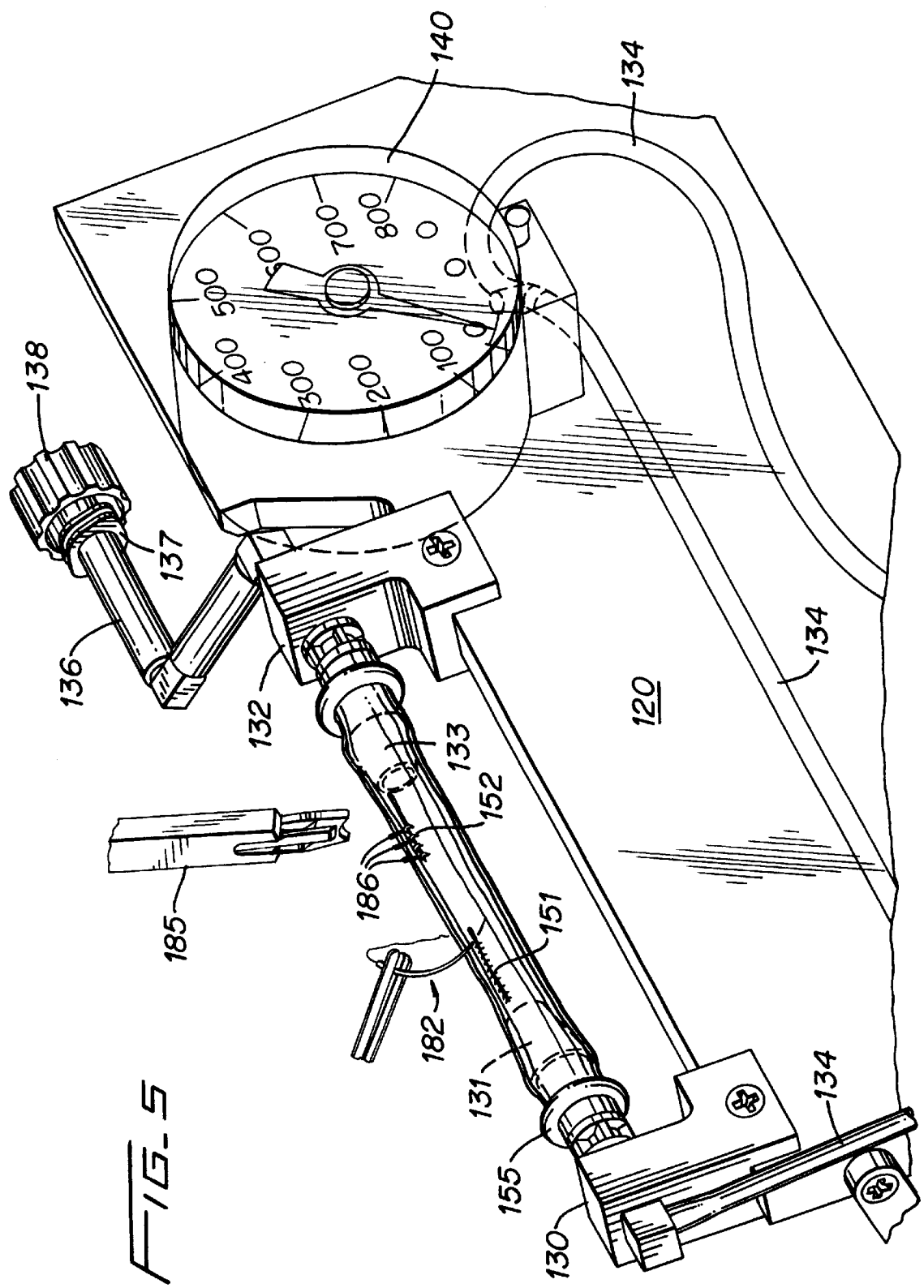

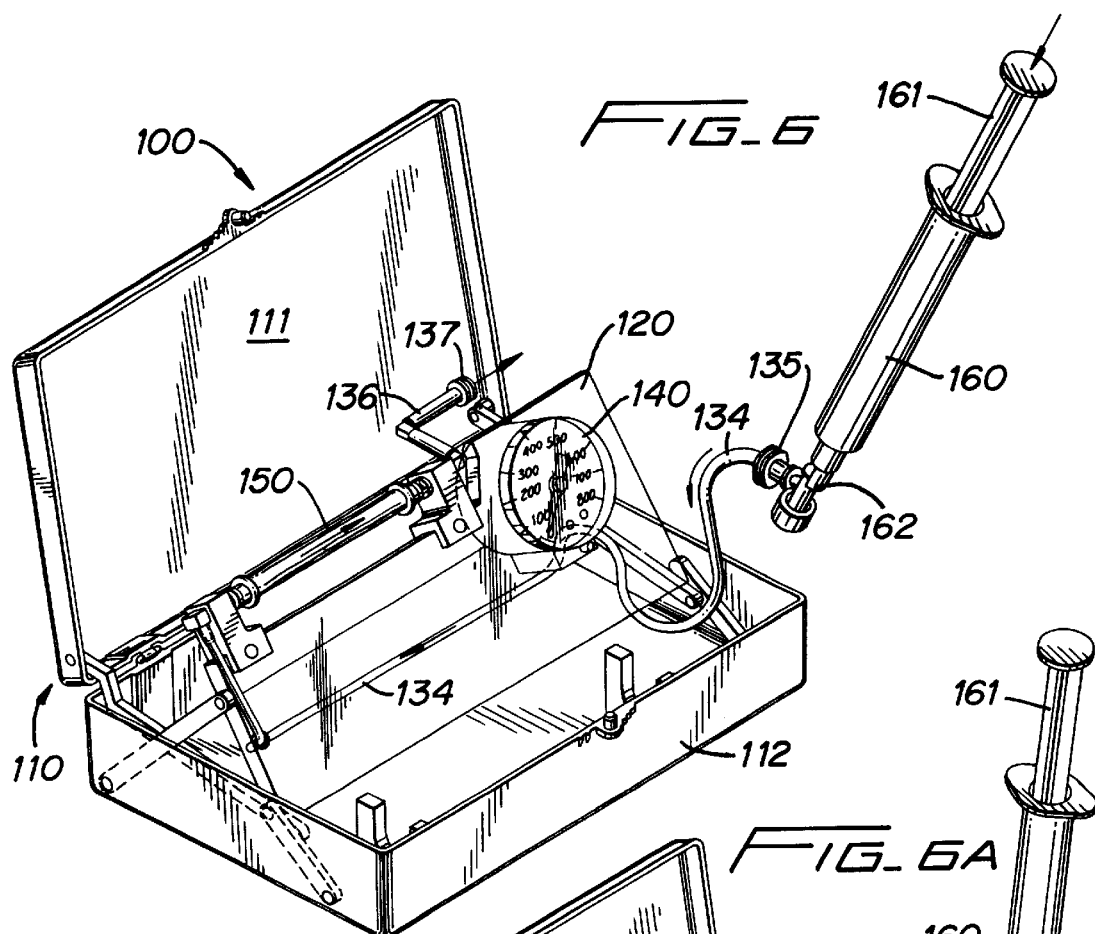
FIG_6
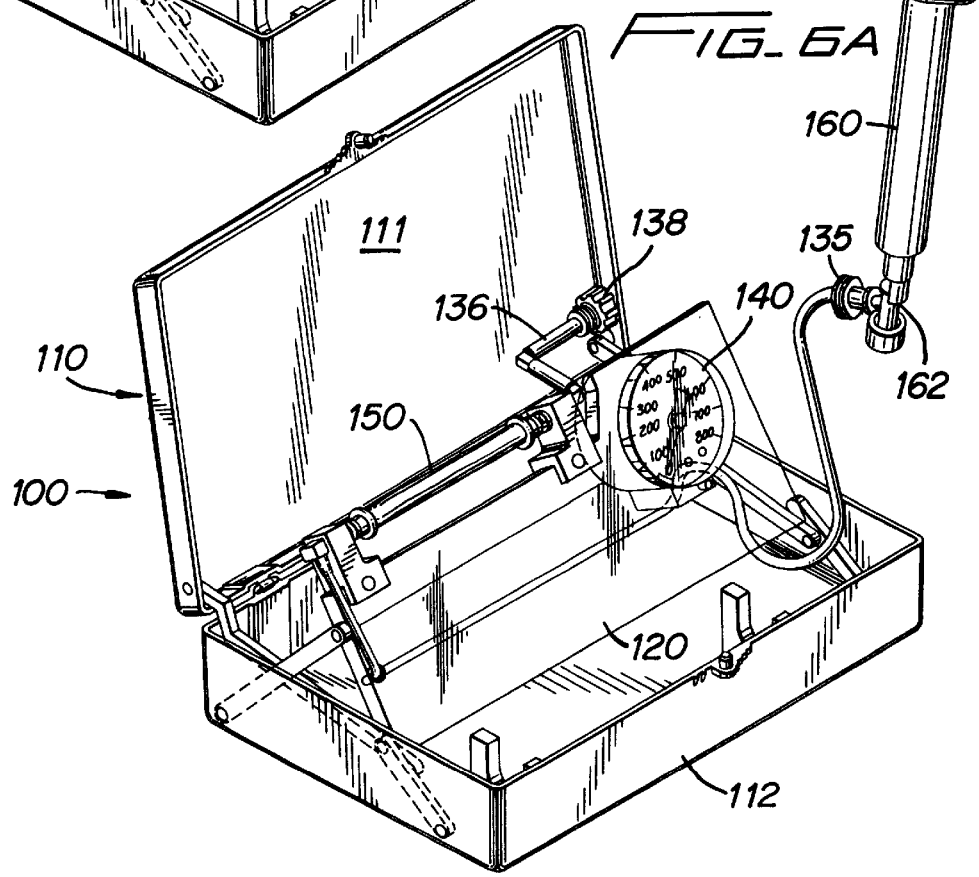
FIG_6A

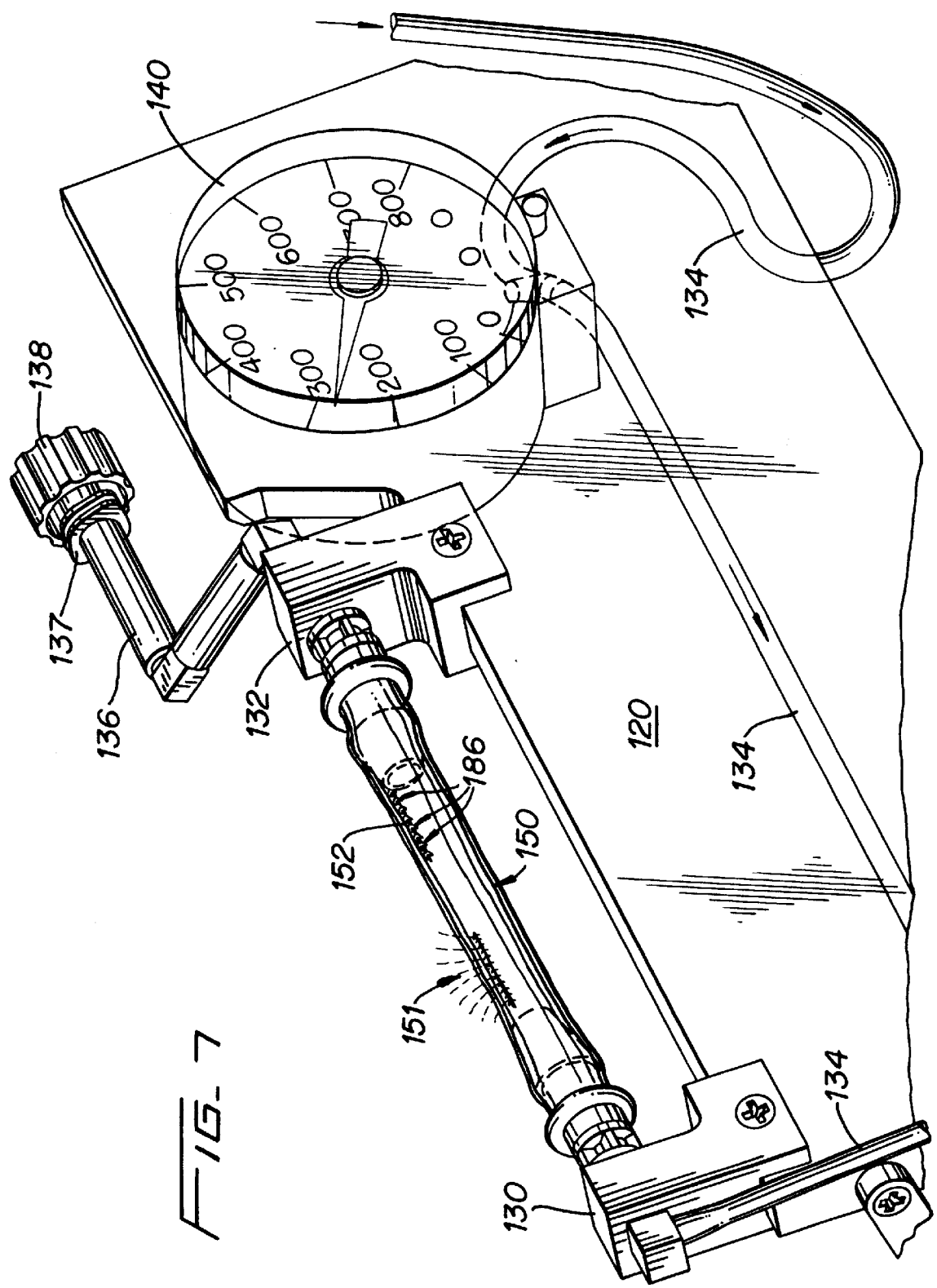

VASCULAR SURGERY DEMONSTRATION/TRAINING KIT

BACKGROUND

1. Technical Field

The present disclosure relates to a demonstration/training kit, and more particularly to a kit for demonstration/training of surgical techniques on blood vessels and/or other anatomical tubular structures.

2. Background of the Related Art

When marketing surgical instruments it is often advantageous to demonstrate the instruments in simulated operation. For example, a sales representative may use a workpiece which simulates human body tissue, such as a sheet of polymeric material to simulate skin tissue. The sales representative can illustrate the functioning of staplers or clip appliers by applying staples or clips to the simulated body tissue in the presence of the potential purchaser, usually a surgeon.

Also, for students and medical personnel it is advantageous to acquire hands-on experience operating on actual or simulated body structures when learning surgical procedures. Apparatus tailored to demonstrate the medical techniques is an important part of an effective training program.

However, there may be only a limited training area or working space to perform a demonstration. Also, the surgeon or sales representatives may have only a brief period of time. It is important, therefore, that items to be used in sales demonstrations or training programs be organized and readily available.

Very often, the surgeon is accustomed to performing a surgical technique in a certain way with certain instruments. Nevertheless, advancements are always being made in various fields of medicine and surgery. A surgeon may be reluctant to depart from his familiar method unless he or she can be clearly convinced of the superiority of a new instrument or technique. To perform a more convincing demonstration it would be advantageous for the sales representative to be able to conduct a comparison between conventional and new instruments and techniques. In the field of vascular surgery this presents several problems. First, the simulated tissue being operated upon is tubular, not flat, and is more difficult to manipulate by hand. Secondly, there is the problem of testing the effectiveness of the fastening methods and tools in a way which accurately reflects performance in body tissue under real physiological conditions.

SUMMARY

The present application provides a kit which compares old and new methods of surgery. The kit includes a mounting structure for releasably receiving a flexible tubular member, the mounting structure including first and second spaced apart support members for sealably engaging respective ends of the flexible tubular member. At least the first support member includes an aperture for permitting passage of pressurized fluid to the flexible tubular member, the first support member being joined to a first fluid conduit for connection to a source of pressurized fluid. The flexible tubular member is preferably a vascular simulation tube, preferably fabricated from a polymeric material. A pressure gauge is preferably connected to the first conduit to provide means for measuring and monitoring the fluid pressure within the system. Preferably, the second support member also includes an aperture for providing fluid communication with the flexible tubular member, the second support member being joined to a second fluid conduit having an outlet port and a cap removably attached to the outlet port.

The kit is preferably enclosed in a container having a first portion and a second portion hingedly connected to the first portion and movable between a closed position in which the first portion and the second portion define an enclosure volume and an open position. The mounting structure includes a frame connected to at least one of the first and second portions of the container. The frame includes a plate mounted to at least one framework of pivotally connected links, the framework being connected to the first and second portions of the container such that the plate is movable between a storage position and a presentation position in response to the movement of the second portion of the container between the closed position and the open position, respectively. When in the storage position, the plate is substantially completely enclosed within the container. When in the presentation position the plate is angled with respect to the bottom surface of the first portion of the container. The kit preferably further includes a pump (e.g., a syringe having a valve adapted to engage the inlet port of the first conduit), needled suture, clip applier with a supply of surgical clips, and demonstration fluid such as glycerine and water.

In a preferred method of demonstration, two side by side slits in the tubular member are repaired using the different respective instruments and methods to be compared. Fluid is pumped into the system and the pressure is raised until the one or both of the repaired slits begins to leak fluid. The kit allows the demonstration to be performed quickly, and effectively.

BRIEF DESCRIPTION OF THE DRAWINGS

Various embodiments are described herein with reference to the drawings wherein:

FIG. 4 is an enlarged perspective view illustrating the flexible tube mounted between the mounting supports of the frame;

FIG. 5 is an enlarged perspective view illustrating the repair of slits in the vascular simulation tube;

FIGS. 6 and 6A are perspective views illustrating a technique for the injection of fluid into the tubular conduit and pressurization of the system; and FIG. 7 is an enlarged perspective view similar to FIG. 5 illustrating pressurization of the system.

DETAILED DESCRIPTION OF PREFERRED EMBODIMENT(S)

In the following description the terms "left" and "right", "front" and "rear" are used relative to each other and do not refer to any fixed frame of reference external to the kit described herein.

Figure 1:
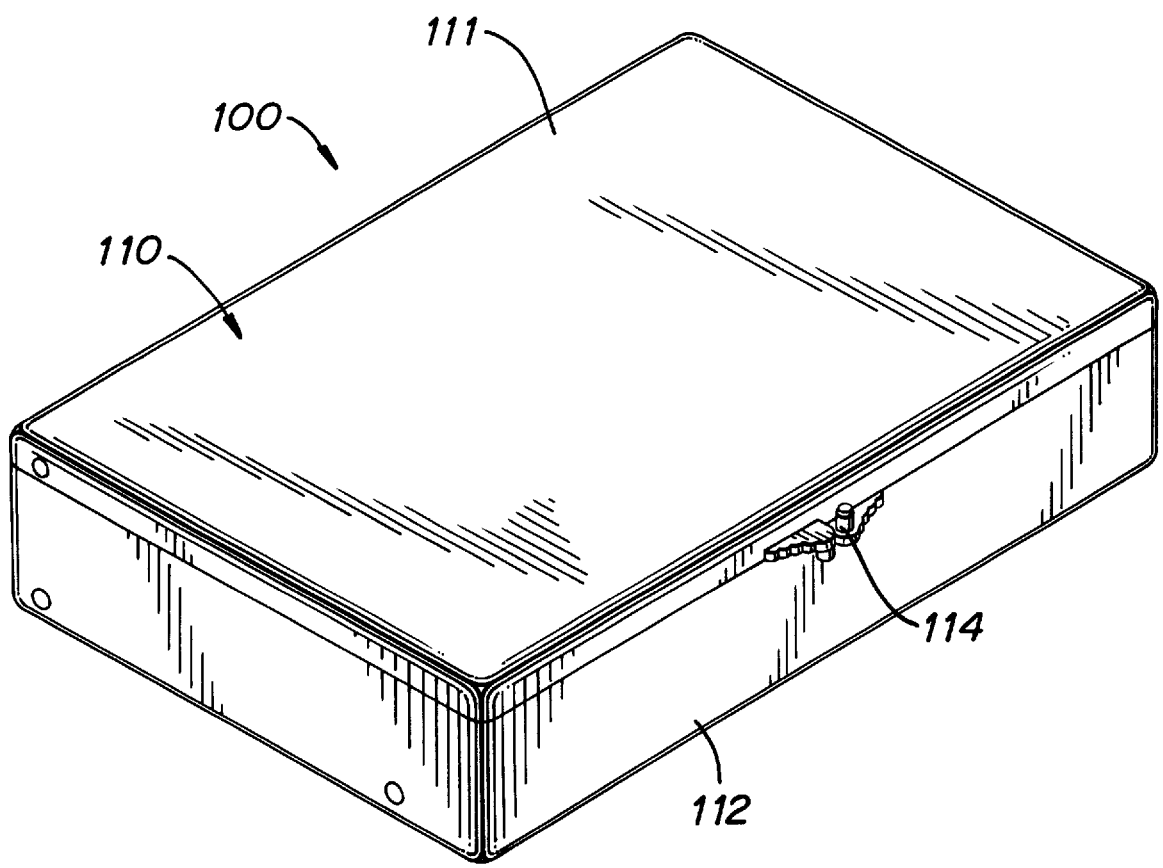
FIG. 1 is a perspective view of the kit in a closed configuration.

Referring to FIG. 1, the vascular surgery demonstration/training kit 100 is preferably contained by outer casing or box 110, shown in the closed configuration. Casing 110 is illustratively about 5 inches to 8 inches in its longest dimension, about 3 inches to 5 inches wide and about 1 inch to 2 inches high. Otherwise dimensions are also contemplated. The kit 100 is preferably portable and is easily carried and set up by a demonstrator. Alternatively, the kit can be of larger dimensions and not contained within a casing.

Figure 2:
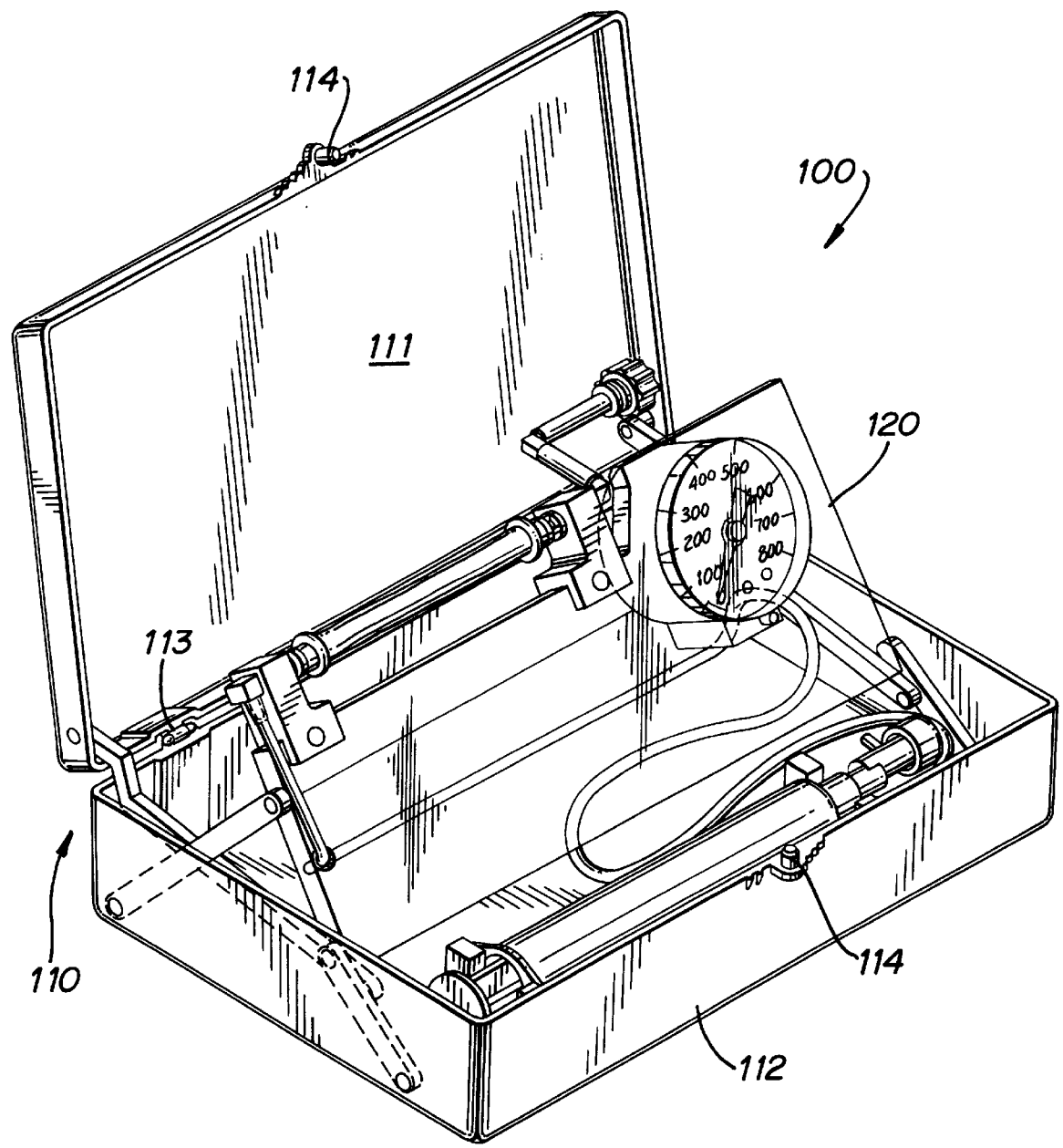
FIG. 2 is a perspective view of the kit in an open configuration.

Referring also now to FIG. 2, kit 100 is shown with outer casing 110 open. Outer casing 110 is preferably fabricated from a durable engineering plastic such as polycarbonate, acrylic, and the like, and includes a lid 111 and bottom portion 112 pivotally linked together at the rear edges by hinges 113. At the front of the casing snap lock engagement 114 maintains the casing in a closed configuration in which casing 110 defines an enclosure. Kit 100 includes a support frame 120 which is moved between an initial storage position and a second presentation position. In the initial storage position casing 110 is closed and support frame 120 is substantially completely enclosed within the enclosure volume defined by casing 110. Preferably support frame 120 is a flat plate which, when in the storage position, is parallel to the base 112a of bottom portion 112. In response to the opening of lid 111, support frame 120 is automatically moved to the second position wherein support frame 120 is positioned upward and angled with respect to bottom portion 112 for presentation to a viewer. Support frame 120 is preferably fabricated from a plate of transparent polymeric material such as acrylic or polycarbonate. To achieve automatic positioning, support frame 120 is mounted to outer casing 110 by a series of pivotally connected links 121, 122, 123, 124, 125, and 126 (FIG. 3).

Figure 3:
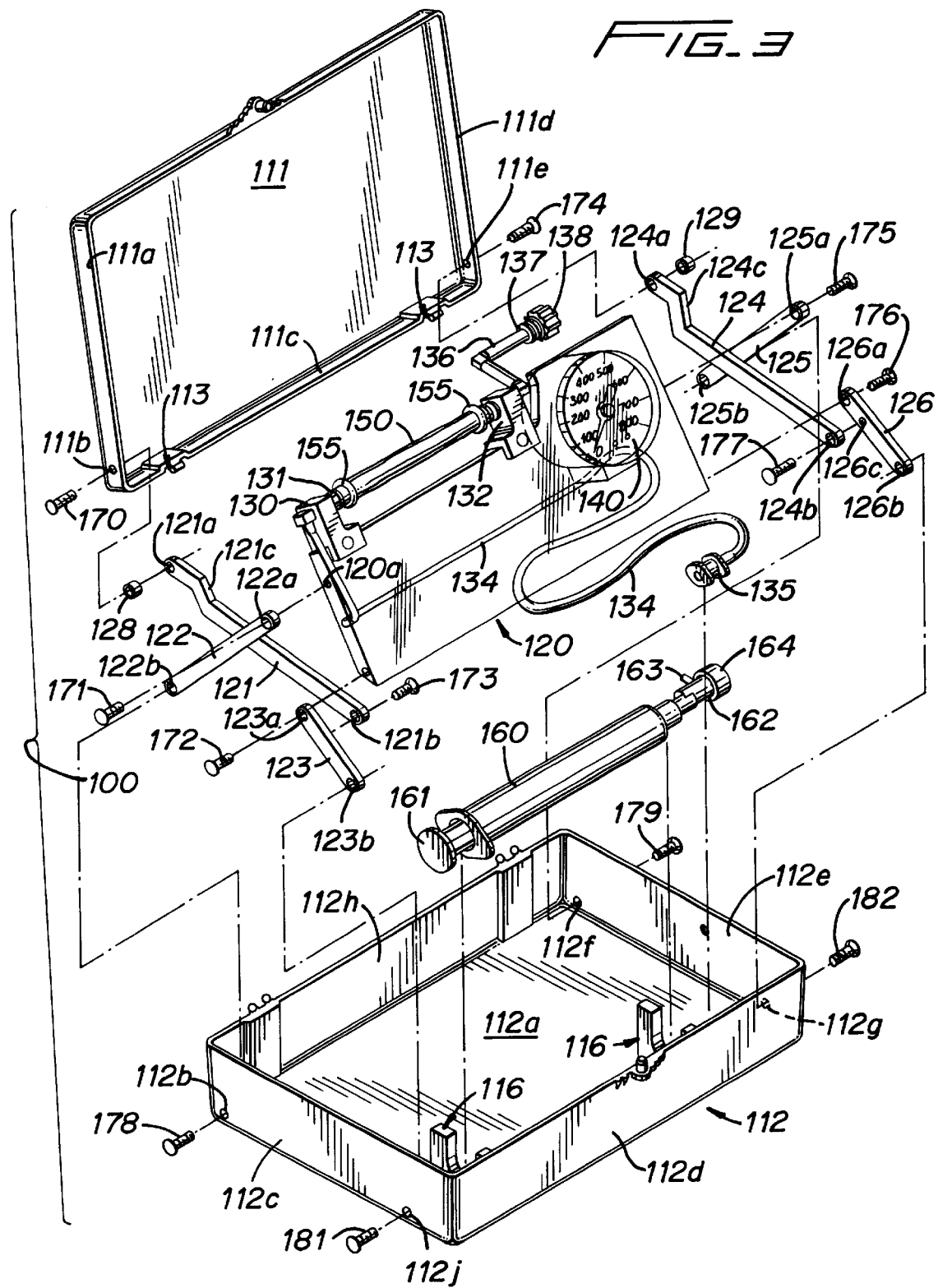
FIG. 3 is an exploded perspective view of the kit.

Referring also now to FIG. 3, link 121 is an elongated member having an angled portion 121c. Link 121 is pivotally fastened to left side 111a of lid 111 in proximity to rear edge 111c of lid 111 by means of screw 170 disposed through aperture 111b in the lid, spacer 128, and aperture 121a in link 121. Screw 173 is disposed through aperture 121b of link 121 and into an aperture (not shown) in link 123.

Link 122 is an elongated member which is pivotally attached to bottom portion 112 of the outer casing and to support frame 120. Screw 171 is disposed through aperture 122a of link 122 and into aperture 120a of support frame 120. Screw 178 is disposed through aperture 112b in left side 112c of the casing bottom portion 112, and through aperture 122b of link 122 thereby pivotally connecting one end of link 122 to the bottom portion left side 112c.

Link 123 is an elongated member having apertures 123a and 123b. Screw 172 is disposed through aperture 123a and through aperture 120b in support frame 120, thereby pivotally linking one end of link 123 to the left edge of the support frame. Screw 181 is disposed through aperture 112j in left side 112c of bottom portion 112 of the outer casing and aperture 123b of link 123, thereby pivotally attaching a second end of link 123 to the bottom portion left side 112c.

Link 124 is an elongated member having an angled portion 124c, and apertures 124a and 124b. Screw 174 is disposed through aperture 111e in right side 111d of lid 111 in proximity to the rear edge 111c of the lid, and through spacer 129 and aperture 124a of link 124, thereby pivotally attached one end of link 124 to lid 111. Screw 177 is disposed through aperture 124b of link 124 and aperture 126c of link 126 to pivotally attach the opposite end of link 124 to link 126.

Link 125 is an elongated member having apertures 125a and 125b. Screw 175 is disposed through aperture 125a and an aperture (not shown) in the right side edge of the support frame 120 thereby pivotally connecting one end portion of link 125 thereto. Screw 179 is disposed through aperture 112f in right side 112e of bottom portion 112 of the outer casing and aperture 125b of link 125, thereby pivotally attaching the other end of link 125 to the bottom portion right side 112e.

Link 126 is an elongated member having apertures 126a, 126b, and 126c. Screw 176 is disposed through aperture 126a and an aperture in the right side edge of the support frame 120, and pivotally connects one end of link 126 to support frame 120. Screw 182 is disposed through aperture 112g in the right side wall 112e of bottom portion 112 and through aperture 126b of link 126, thereby pivotally connecting the other end of link 126 to bottom portion 112.

As mentioned above, aperture 126c receives screw 177 for pivotally connecting one end of link 124 to link 126.

The above described arrangement of links enables the support frame 120 to be automatically moved from its storage position to its presentation position in response to opening of lid 111. Support frame 120 automatically moves back to its storage position in response to closing of lid 111.

Referring now to FIGS. 3 and 4, the kit 100 includes a flexible tube 150 which preferably simulates tubular body tissue such as vascular segments and the like. Alternatively, tube 150 can be actual body tissue. While flexible tube 150 is hereinafter referred to as a vascular simulation tube, it should be understood that, in this embodiment, tube 150 can simulate any type of body tissue adapted for the conveying of fluid under pressure. Vascular simulation tube 150 is illustratively about 2 to 3 inches in length and is preferably fabricated from a polymeric material such as, for example, polytetrafluoroethylene ("PTFE"). Vascular simulation tube 150 is mounted between left and right nozzles 131 and 133, respectively, on left and right mounting fixtures 130 and 132, respectively, and is secured thereto, optionally by means of resilient O-rings 155. Preferably included is a vent conduit 136 connected to right mounting fixture 132 such that a fluid passageway extends through vascular simulation tube 150, nozzle 133, mounting fixture 132, and vent conduit 136. Vent conduit 136 is jointed and pivotable so as to fold underneath or above support frame 120 and terminates in an outlet 137 which is sealed by a removable cap 138.

Left mounting fixture 130 is connected to flexible tubular conduit 134 which extends downward from the left mounting post, then underneath and along the length of the frame 120 where it is connected to pressure gauge 140. Conduit 134 thereafter extends as a freely movable length of tubing and terminates at inlet port 135.

In order to introduce fluid into the flexible conduit 134 a pump 160 (FIG. 3) is preferably included as part of the kit 100. Pump 160 is preferably a syringe which is removably mounted to upright mounting posts 116, and which includes a plunger 161. At the forward tip of the syringe there is an outlet valve 162 having a nozzle 163 which is adapted to engage inlet port 135 of flexible tubular conduit 134 Outlet valve 162 can also include a spring biased release button 164 for opening the valve 162 when pressed.

Additional kit accessories can optionally include one or more scalpels, needled sutures, forceps, clip appliers (with clips), and a container of demonstration fluid. The demonstration fluid is preferably a solution of glycerin and water to which dye may optionally be added.

Kit 100 can be used for training students and/or other medical personnel in the performance of suturing operation on vascular tissue. Also, kit 100 provides means for comparing the effectiveness of different methods and apparatus for the suturing of vascular tissue or other tubular structures of body tissue, with means for quantifying the difference in effectiveness between the two suturing or repair methods.

The following procedure is an example of how kit 100 can be used to provide such a demonstration.

By way of illustration, the demonstrator opens kit 100, applies a vascular simulation tube 150 to the mounting fixtures 130 and 132 such that the ends of the vascular simulation tube 150 are engaged to the respective left and right nozzles 131 and 133. O-rings 155 are disposed over the end portions of the vascular simulation tube 150 to provide a fluid tight seal between the ends of vascular simulation tube 150 and nozzles 131 and 133. Optionally, the vascular simulation tube 150 can already be mounted to the mounting fixtures and, prior to the opening of kit 100, can be positioned for performance of the demonstration in order to save time.

Referring to FIG. 4, two side-by-side slits 151 and 152 are made in the vascular simulation tube 150 with a scalpel 190 or other suitable cutting implement. Alternatively, the slits can be pre-cut into the vascular simulation tube 150 to save time. Each slit should preferably be about 0.25 inches to 0.5 inches in length, although other size slits can be made.

Referring to FIG. 5, one of the two slits, for example slit 151, is then sutured closed by means of, for example, needle and suture 182. The suture can be, for example, monofilament of multifilament and can be bioabsorable or non-bioabsorable. Preferably the suture is size 6-0 for purposes of demonstration. The other slit (i.e., slit 152) is sutured by applying clips 186 by means of a clip applying apparatus 185. A clip applying apparatus suitable for use in such a demonstration and vascular clips for application to the slit are disclosed and described in U.S. Pat. No. 5,591,178 and European patent application 94115787.7 and are commercially available from United States Surgical Corporation of Norwalk, Conn. under the designation VCS™ clip applier. The second slit 152 is sealed by everting the edges of the tube (or tissue) with forceps and applying the clips to the everted edges spaced from about 0.5 to about 1.0 mm apart. Optionally, both of the slits (151, 152) and the repairs thereto can be performed in advance of the demonstration to save time, although it is preferable to include these procedures as part of the demonstration.

Referring to FIGS. 6 and 6A after slits 151 and 152 are respectively sutured, cap 138 is removed from outlet port 137. Syringe 160 is filled with the demonstration fluid. Nozzle 163 of outlet valve 162 is inserted into inlet port 135 and plunger 161 is depressed to inject the test fluid into conduit 134. Release button 164 is also depressed to open valve 162. (When release button 164 is released valve 162 returns to its closed position.) The fluid is injected through the conduit 134 and through vascular simulation tube 150 until fluid has reached the outlet port 137. Cap 138 is then reapplied to outlet port 137 to form a fluid tight seal. Plunger 161 and release button 164 are again pressed, thereby pressurizing the fluid in the test system.

Force is continually applied by the demonstrator to gradually increase the pressure in the system, which is indicated by gauge 140.

By way of example, it has been observed that the slit sutured by conventional needle and suture thread typically begins to leak fluid when the test system is pressurized to about 200 mm Hg.

The slit sealed by the clips 186 applied by clip applier 185 retains its integrity to well over 600–800 mm Hg and does not leak fluid. The superiority of the VCS™ clip applier over conventional suturing is thereby demonstrated.

Although the kit is described above as being used by first providing two side by side slits, closing both slits with different closing means, and injecting fluid, it is also contemplated that each closing means be demonstrated separately. That is, in such embodiment, the demonstrator would initially make only one slit and then apply VCS* clips. Fluid would then be inserted to demonstrate that the integrity of the wall is maintained, for example, to well over 600–800 mm Hg. The pressure would then be released and a second slit made and closed by closing means such as a suture. The tube would once again be pressurized to demonstrate leakage for example, at a pressure of about 200 mm Hg. It is also contemplated that alternatively, the suture can be applied to the first slit and then afterwards the VCS* clips applied to the second slit.

It will be understood that various modifications may be made to the embodiments described herein. For example any means to demonstrate closing the slit can be utilized such as clips, staples, sutures and other wound closure apparatus/methods. Therefore the above description should not be viewed as limiting, but merely as exemplifications of preferred embodiments. Those skilled in the art will envision other modifications within the scope and spirit of the claims appended hereto.

What is claimed is:

1. A surgery demonstration/training kit, comprising:
   a mounting structure for releasably receiving a flexible tubular member, the mounting structure including at least a first support member for sealably engaging a first open end of the flexible tubular member, the first support member including an aperture for permitting passage of pressurized fluid to the flexible tubular member, and the first support member being joined to a first fluid conduit for connection to a source of pressurized fluid, wherein the mounting structure is hingedly mounted to a base and is pivotally movable between a first position and a second position.

2. The kit of claim 1 further including a measuring instrument for measuring and indicating fluid pressure, the measuring instrument being connected to the first fluid conduit.

3. The kit of claim 2 wherein the mounting structure further includes a second support member for sealably engaging a second open end of the tubular member, the second support member including an aperture for providing fluid communication with the flexible tubular member, wherein the second support member is connected to a second fluid conduit.

4. The kit of claim 3 wherein the second fluid conduit has an outlet port and a cap removably attached to the outlet port.

5. The kit of claim 4 wherein the mounting structure includes a planar frame which is substantially parallel to the base when the mounting structure is in the first position and in an angled orientation with respect to the base when the mounting structure is in the second position.

6. The kit of claim 2 further comprising a container having a first portion and a second portion hingedly connected to the first portion and movable between a closed position in which the first portion and the second portion define an enclosure volume and an open position.

7. The kit of claim 6 wherein the mounting structure includes a frame connected to at least one of the first and second portions of the container.

8. The kit of claim 7 wherein the frame includes a plate mounted to at least one framework of pivotally connected links, wherein said at least one framework is connected to the first and second portions of the container such that the plate is movable between a storage position and a presentation position in response to movement of the second portion of the container between the closed position and the open position respectively.

9. The kit of claim 8 wherein the plate is substantially completely enclosed within the container when the plate is in the storage position, and the plate is angled with respect to a bottom surface of the first portion of the container when the plate is in the presentation position.

10. The kit of claim 7 wherein the measuring instrument is a pressure gauge attached to the frame.

11. The kit of claim 1 further including a pump adapted to engage an inlet port of the first fluid conduit.

12. The kit of claim 1 wherein the flexible tubular member is a vascular simulation tube configured and dimensioned to be mountable to the first and second support members and fabricated from a polymeric material.

13. The kit of claim 12 further including a needled suture, a clip applier and a supply of surgical clips.

14. A method for demonstrating a repair of vascular tissue, comprising the steps of:
   a) providing a surgical kit including a mounting structure for releasably receiving a flexible tubular member;
   b) mounting the flexible tubular member to the mounting structure;
   c) forming at least one slit in the flexible tubular member;
   d) repairing said at least one slit with a surgical means for fastening body tissue;
   e) pumping fluid to the inside of the flexible tubular member; and
   f) gradually increasing the pressure of the fluid.

15. The method of claim 14 wherein the mounting structure includes first and second spaced apart support members for sealably engaging respective ends of the flexible tubular member, at least said first support member including an aperture for permitting passage of pressurized fluid to the flexible tubular member, the first support member being joined to a first fluid conduit for connection to a source of pressurized fluid.

16. The method of claim 14 wherein the second support member includes an aperture for providing fluid communication with the flexible tubular member and the second support member is joined to a second fluid conduit.

17. The method of claim 14 wherein the step of forming at least one slit in the flexible tubular member comprises forming two slits.

18. The method of claim 17 wherein the kit includes a needled suture and a clip applier with surgical clips and the step of repairing said at least one slit comprises repairing one of said two slits with the needled suture and the other of the two slits with the clip applier and surgical clips.

19. The method of claim 18 wherein the second fluid conduit has an outlet port and a cap removably attached to the outlet port, and the first conduit has an inlet port, and the kit further includes a syringe pump adapted to engage the inlet port of the first fluid conduit,
   wherein the step of pumping fluid to the inside of the vascular simulation tube comprises removing the cap from the outlet of the second conduit, engaging the inlet port of the first conduit with the syringe pump, and pumping fluid through the first conduit, the vascular simulation tube, and the second conduit until at least some fluid reaches the outlet of the second conduit.

20. The method of claim 19 wherein the step of gradually increasing the pressure of the fluid comprises attaching the cap to the outlet port of the second conduit to form a fluid tight seal and applying increased fluid pressure by means of the syringe pump.

21. The method of claim 20 wherein the demonstration kit further includes a pressure gauge connected to the first fluid conduit and the method further includes the step of monitoring the pressure of the fluid while gradually increasing the fluid pressure.

* * * * *